E. B. KILLEN.
VEHICLE WHEEL.
APPLICATION FILED MAR. 12, 1917.
1,279,551.
Patented Sept. 24, 1918.
3 SHEETS—SHEET 1.
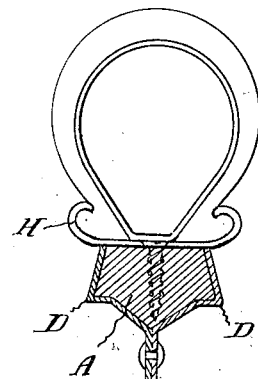
Fig. 1
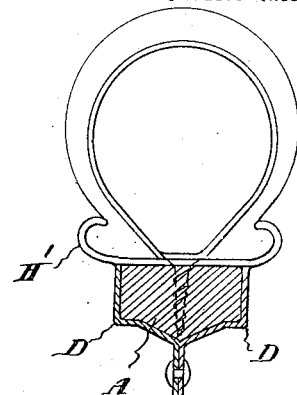
Fig. 2
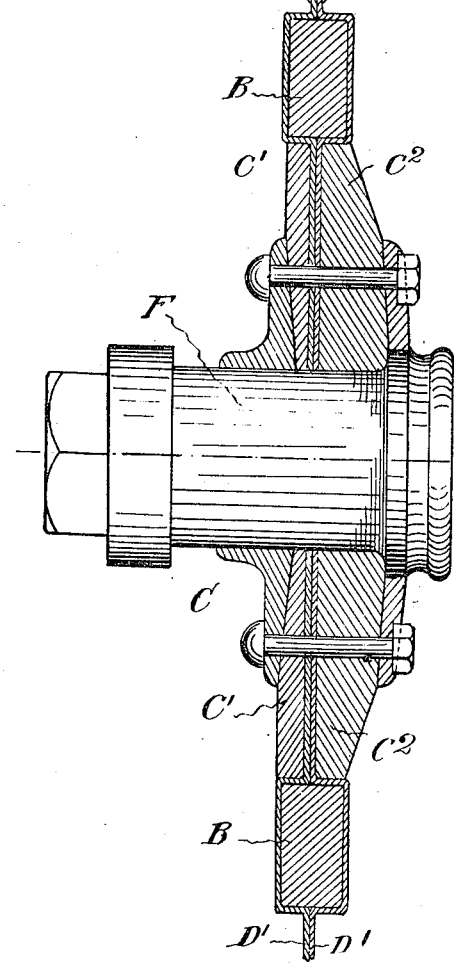
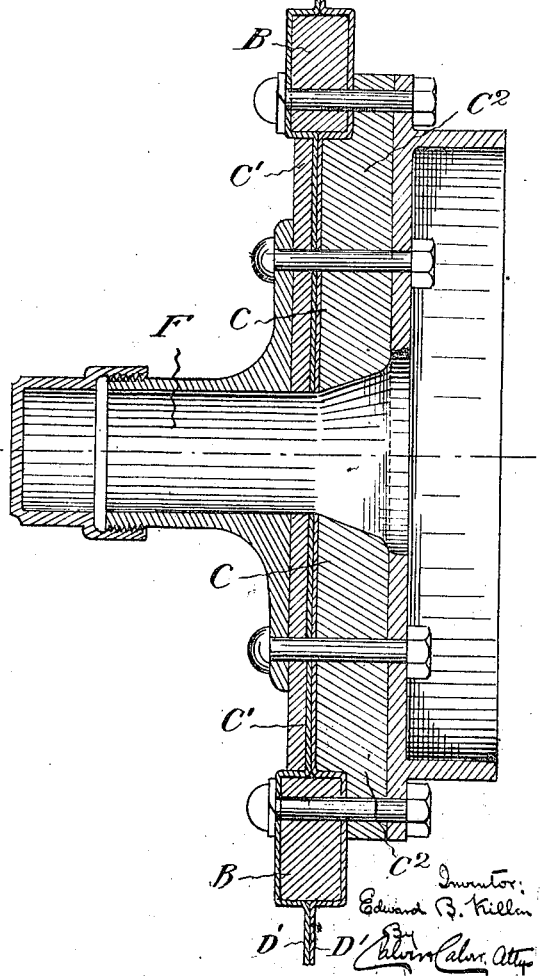
Inventor:
Edward B. Killen
Calvin Calvin Atty

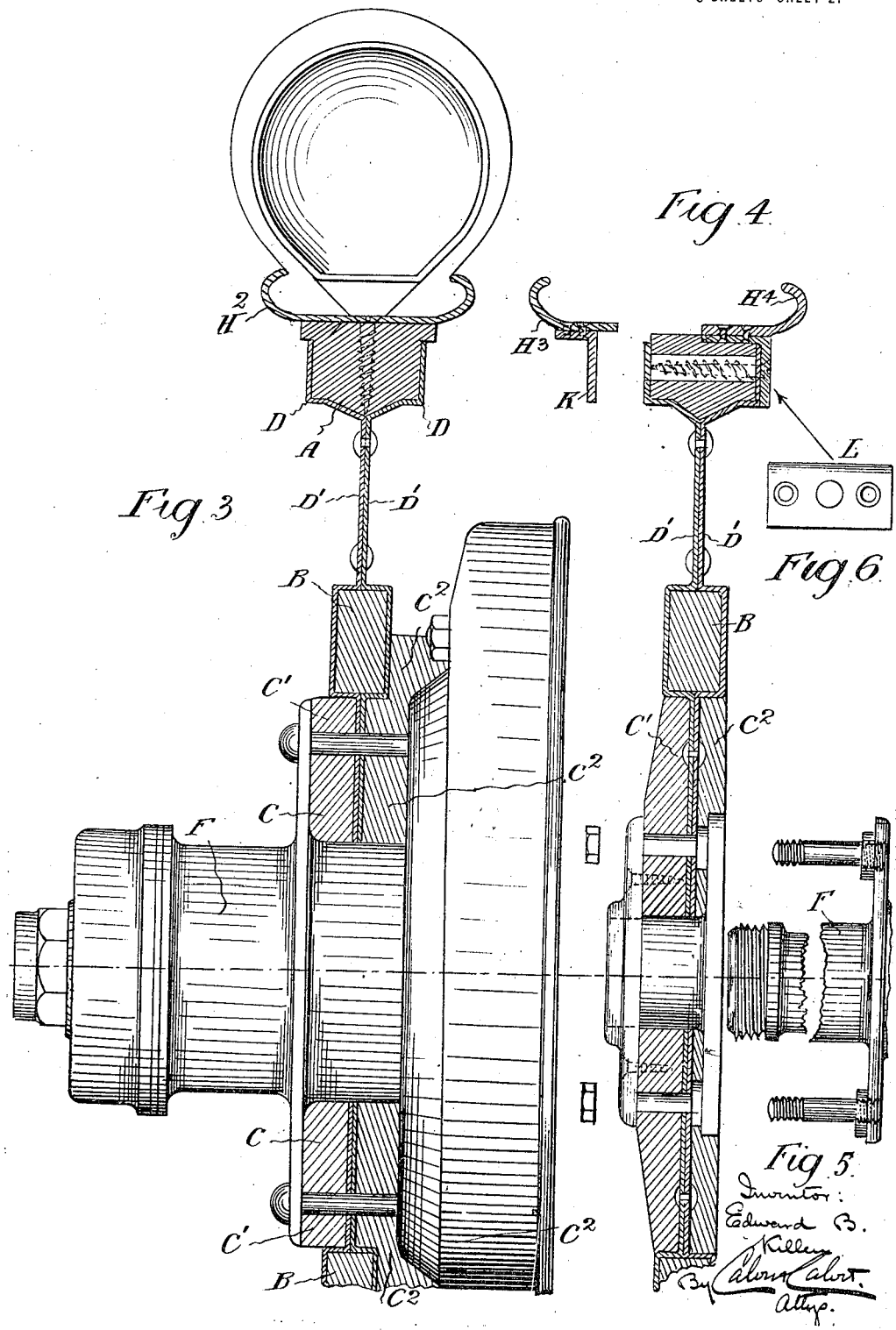

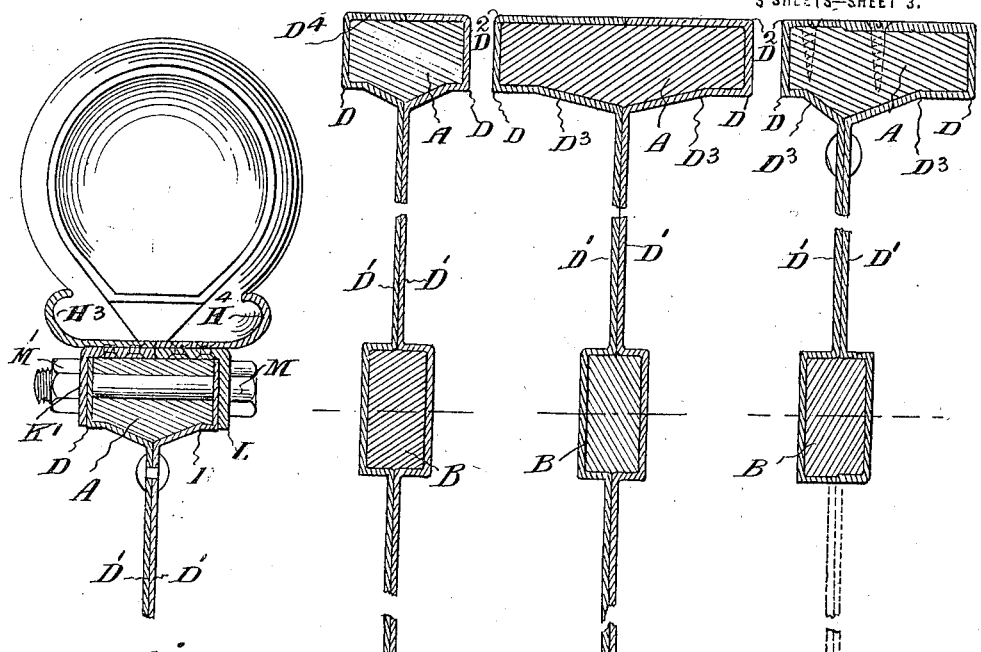

UNITED STATES PATENT OFFICE.

EDWARD BRICE KILLEN, OF LONDON, ENGLAND.

VEHICLE-WHEEL.

1,279,551.

Specification of Letters Patent.  Patented Sept. 24, 1918.

Application filed March 12, 1917.  Serial No. 154,173.

*To all whom it may concern:*

Be it known that I, EDWARD BRICE KILLEN, of 27 Queen Victoria street, London, E. C., England, engineer, have invented certain new and useful Improvements in Vehicle-Wheels, of which the following is a specification.

My invention relates to the construction and standardization of compound wheels, all as hereinafter more fully described with reference to the drawings and pointed out in the claims.

In order that my invention may be properly understood and readily carried into effect, I have hereunto appended three sheets of drawings, of which—

Figure 1 shows my wheel rigidly attached to a front hub with an existing tire retaining rim and a pneumatic tube tire rigidly fitted over same, the two bottoms of the dish-like stampings having the same center line as the center line of the wheel.

Fig. 2 shows the same wheel rigidly attached to a back hub with an existing tire retaining rim and pneumatic tube tire of different dimensions from Fig. 1 rigidly fitted over same.

Fig. 3 shows the same wheel rigidly fitted to a different type of back hub with an existing tire retaining rim and pneumatic tube tire of different dimensions from Figs. 1 and 2 rigidly fitted over same.

Figs. 4 and 5 represent the same wheel fitted detachably to an existing hub, showing how the hub bolts and nuts are used for attaching and detaching the wheel.

Figs. 4 and 6 show how an existing tire retaining rim may be circumferentially divided and rigidly fitted to the circumference of the wheel, forming a clamping circumference device for attaching tires rigidly in position to the circumference of the wheel.

Fig. 7 shows a modified form of the construction illustrated in Fig. 4 showing the clamping circumference device rigidly fitted to the circumference of the same wheel, enabling existing types of tire retaining rims to be used and circumferentially divided, thereby facilitating the easy attachment and detachment of existing pneumatic tube tires over my wheel.

Fig. 8 shows a modified form of the construction illustrated in Figs. 1, 2 and 3 but of larger diameter and having its extreme truly circular circumference metal instead of wood, with the two bottoms of the dish-like stampings lying side by side on the same center line as the center line of the wheel.

Fig. 9 shows a modified form of the construction illustrated in Fig. 8 with a wider circumference part, and having its extreme circumference metal instead of wood.

Fig. 10 shows a modified form of the construction illustrated in Figs. 8 and 9 where the center line of the inner attachment flange $D^1$ formed by the bottoms of the two dishlike stampings is not on the same center line as the center line of the wheel's outer circumference.

Each wheel has a wood felly part A, which, when in use, is preferably entirely armor plated, a strengthening central wood ring part B, also armor plated, and may have when required a renewable wood center part C, almost entirely armor plated when the hub is attached. The wood felly part A and the strengthening central wood ring part B are snugly fitted and secured in position between the two steel dish-like stampings D when the latter are riveted together back to back, and the strengthening central wood ring part B which is armor plated lies completely outside and independent of the renewable wood center part C to which the hub F may be attached.

This compound wheel may be constructed from two exactly similar dish-like steel stampings D. One metal stamping may form the greater part of the back face of the wheel and armor plate one half of the wood felly, and the other stamping may form the greater part of the front face of the wheel and armor plate the remainder of the wood felly when two dish-like stampings are riveted together back to back, see Figs. 8 and 9.

The circular metal plates or disks $D'$ are shaped to form recesses or pockets, about midway between their centers and circumferences, for the reception of the strengthening or stiffening wood rings B which are thus inclosed and protected by the metal of said disks.

Each dish-like stamping may be manufactured with two truly circular metal bed circumferences $D^2$, $D^3$ (see Fig. 8) which key the wood felly parts A in position between the two metal bed circumferences, and when the two dish-like stampings are clamped and riveted together the combination forms a truly circular metal bed circumference $D^4$ without turning the metal for my compound wheel which is practically non-distortable, and the two bottoms of the dish-like stampings as they lie side by side when riveted together back to back may form the center line of the wheel.

Each dish like stamping may have its outer and inner truly circular metal bed circumference constructed say one to two inches apart, to form a receptacle for the wood felly which is thus protected and armor plated by suitably riveting together back to back the two disk-like stampings, but if required, the extreme metal circumference of the compound wheel may be dispensed with leaving an extreme outer circumference of wood formed by the wood felly part, which wood circumference if used is capable of being turned truly circular to suit many varying diameters of existing tire retaining metal rims, which may be easily fitted over it, without interfering with the wheel's rigidity, see Figs. 1, 2, 3, 4 and 7. Under certain conditions the wood felly part may be secured in position by bringing the extreme metal edges of the disk-like stampings at the wheel's extreme circumference say a sixteenth of an inch or more closer together (the wood felly on its outer circumference being shaped to allow this to take place), thereby locking the wood felly in position by the extreme metal edges of the dish-like stampings, before the metal tire retaining rim is fitted over the wood circumference, see Fig. 1, which tire retaining rim when fitted practically armor plates the entire wood felly part.

After armor plating the strengthening central wood ring part B, the metal of the two dish-like stampings may run side by side toward the center of the wheel, forming dish-like cavities on each side at the wheel's center, into which cavities right and left stiffening circular wood disks $C^1$ and $C^2$ may be fitted and secured. The fitting of the wood disks into the cavities under compression keys the wood disks in position, and the hub plates lock them in position.

This construction of compound wheel enables a renewable wood center part C to be formed and secured into position at the center of the wheel, which is capable of being turned out to take practically any dimension or type of hub and give any required clearance between wheel and chassis frame, the hub F when attached practically armor plates the most of the renewable wood center part, and the wheel may be made a fixture or be de achable on the hub as required by means of hub attachment bolts and nuts, without interfering with the rigidity of the wheel, see Figs. 1, 2, 3, 4 and 5. This construction of wheel enables a light compound disk wheel to be built having an extreme outer truly circular circumference of metal or wood as required.

It is to be specially noted that when the extreme circumference of my wheel is formed of wood, see Figs. 1, 2, 3, 4 and 7, existing tire retaining metal rims H, $H^1$, $H^2$, see Figs. 1, 2 and 3, of various dimensions may be circumferentially divided, see Figs. 4 and 7, and each endless half rim $H^3$, $H^4$ be rigidly attached to the wheel's circumference by riveting an endless flanged rim K, $K^1$ or brackets L to the inner circumference of each half endless rim $H^3$, $H^4$, enabling the two half rims to be rigidly attached and clamped by means of bolts M and nuts $M^1$ over the wheel's circumference, forming with the wheel's circumference a clamping circumference device, see Figs. 4 and 7 without the objectionable feature of having to fit one endless metal rim over another endless metal rim. When brackets L are used instead of an endless rim K, $K^1$, to clamp an endless half rim in position, the brackets may fit into corresponding slots formed in the outer wood circumference to snugly take the metal brackets, and in all my wheels the wood distance pieces tend to prevent objectionable resonance in the wheel under working conditions.

Having thus described my invention I claim and desire to secure by Letters Patent:

1. A disk vehicle wheel comprising two circular metal plates suitably secured together and provided, about midway between their centers and circumferences, with recesses or pockets, and a strengthening or stiffening wood ring inclosed in said recesses or pockets.

2. A disk vehicle wheel comprising two circular metal plates suitably secured together and provided, about midway between their centers and circumferences, with recesses or pockets, and a strengthening or stiffening wood ring inclosed in said recesses or pockets, said plates being shaped at their peripheral portions to form a felly receptacle, combined with a wood felly held in place in said receptacle and being thus protected or armor plated by portions of said plates.

3. A disk vehicle wheel comprising two circular metal plates suitably secured together and provided, about midway between their centers and circumferences, with recesses or pockets, and a strengthening or stiffening wood ring inclosed in said recesses or pockets, said plates being shaped at their peripheral portions to form a felly receptacle, combined with a wood felly held in place in said receptacle and being thus protected or armor plated by portions of said plates, and stiffening wood rings fitted and secured in place on opposite sides of the inner parts of said circular metal plates.

In witness whereof I affix my signature in presence of two witnesses.

EDWARD BRICE KILLEN.

Witnesses:
JOHN LIDDLE,
JOHN TRAIN LIDDLE.